(12) United States Patent
Lum

(10) Patent No.: US 11,895,041 B2
(45) Date of Patent: Feb. 6, 2024

(54) ESTABLISHING NETWORK PRESENCE

(71) Applicant: Zoom Video Communications, Inc., San Jose, CA (US)

(72) Inventor: Samuel Lum, Sunnyvale, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 18/106,754

(22) Filed: Feb. 7, 2023

(65) Prior Publication Data
US 2023/0188478 A1 Jun. 15, 2023

Related U.S. Application Data

(63) Continuation of application No. 17/151,106, filed on Jan. 15, 2021, now Pat. No. 11,601,381.

(51) Int. Cl.
G06F 15/173 (2006.01)
H04L 47/70 (2022.01)
H04L 43/08 (2022.01)
H04N 7/18 (2006.01)
G06K 7/10 (2006.01)
G10L 25/51 (2013.01)
H04R 1/08 (2006.01)
G06K 7/14 (2006.01)
H04L 65/403 (2022.01)
H04L 51/043 (2022.01)

(52) U.S. Cl.
CPC .......... H04L 47/82 (2013.01); G06K 7/10722 (2013.01); G06K 7/1417 (2013.01); G10L 25/51 (2013.01); H04L 43/08 (2013.01); H04L 51/043 (2013.01); H04L 65/403 (2013.01); H04N 7/185 (2013.01); H04R 1/08 (2013.01)

(58) Field of Classification Search
CPC ..................................................... H04L 51/043
See application file for complete search history.

(56) References Cited

U.S. PATENT DOCUMENTS

| 4,509,167 | A | * | 4/1985 | Bantel | H04L 12/1813 370/360 |
|---|---|---|---|---|---|
| 8,576,750 | B1 | * | 11/2013 | Hecht | H04L 12/1818 379/202.01 |
| 8,754,924 | B1 | * | 6/2014 | Shane | H04N 7/15 348/14.05 |
| 9,471,698 | B1 | | 10/2016 | Liu et al. | |
| 10,897,599 | B1 | * | 1/2021 | Fardig | H04N 7/147 |
| 2010/0007713 | A1 | | 1/2010 | Yamamoto | |
| 2011/0025820 | A1 | | 2/2011 | Fisher et al. | |
| 2015/0088495 | A1 | | 3/2015 | Jeong et al. | |
| 2019/0056494 | A1 | | 2/2019 | Sophinos et al. | |

(Continued)

Primary Examiner — Wing F Chan
Assistant Examiner — Joseph R Maniwang
(74) Attorney, Agent, or Firm — Young Basile Hanlon & MacFarlane, P.C.

(57) ABSTRACT

Methods and apparatus for establishing network presence. In an embodiment, a method is provided for determining a presence score. The method includes capturing an image of a QR code displayed on a secondary device, capturing a sound clip of a sound signal reproduced on the secondary device, and transmitting the image and the sound clip to a server. The method also includes receiving a presence score determined from at least one of a comparison of the QR code to the image and a comparison of the sound signal to the sound clip.

17 Claims, 8 Drawing Sheets

METHOD FOR OPERATING A USER DEVICE

(56) References Cited

U.S. PATENT DOCUMENTS

2019/0205865 A1    7/2019   Jamkhedkar et al.
2021/0374374 A1   12/2021   Chambard et al.
2021/0390576 A1   12/2021   Wargo et al.
2022/0060471 A1    2/2022   Wilson et al.

* cited by examiner

FIG. 5 — METHOD FOR OPERATING A USER DEVICE

FIG. 6  METHOD FOR OPERATING A SERVER

ESTABLISHING NETWORK PRESENCE

CROSS-REFERENCE TO RELATED APPLICATIONS

This application is a continuation of U.S. Non-Provisional application Ser. No. 17/151,106, filed on Jan. 15, 2021, which contains subject matter which may be related to the subject matter in U.S. patent application Ser. No. 17/151,101, entitled "METHODS AND APPARATUS FOR ACCESSING NETWORK PRESENCE" filed on Jan. 15, 2021 and assigned to the assignee of the present application, which are hereby incorporated by reference in their entirety.

FIELD

The exemplary embodiments of the present invention relate to the field of network communication. More specifically, the exemplary embodiments of the present invention relate to determining network presence.

BACKGROUND

With the increasing popularity of digital electronics and network communications, real-time interactive network conferences (or meetings) have become more popular. For example, network conferencing applications now allow people to communicate with each other from remote locations to exchange audio and video in real time.

During a network conference, each meeting attendee can transmit video and audio signals to other attendees. A typical conferencing device is configured with a camera that captures an image of a conference attendee and a microphone that captures the attendee's voice. Unfortunately, it may be possible for a recorded image or voice to be substituted for the real-time interactions of a conference attendee. It is also possible to replace the real-time user interactions when accessing other types of network services. Thus, it is desirable to have a mechanism to determine network presence, which indicates the probability that the interactions of a user device are from a real person and not a recording or other simulation.

SUMMARY

In various embodiments, methods and apparatus are disclosed for real-time presence assessment, establishment, and monitoring. In an embodiment, when a user device requests to access network services, a server performs a presence assessment operation that determines a presence score. The presence score indicates the probability that the user device is providing interactions from an actual person and not a robot, simulation, or pre-stored information. In an embodiment, the server transmits a quick response (QR) code and a generated sound signal to a secondary device associated with the user of the user device. For example, the secondary device can be a smartphone associated with the user. The user positions the secondary device so that a camera of the user device can capture an image of the QR code displayed on a display screen of the secondary device. The microphone of the user device captures a sound clip of the sound signal reproduced by the secondary device.

The captured image and sound signal are transmitted to the server along with a resource identifier that identifies the resources in use at the user device. The server generates a presence score by comparing the transmitted QR code and sound signal with the captured versions received from the user device. In an embodiment, an application at the user device monitors the resources being utilized, and if a change is detected, an updated resource identifier is generated and transmitted to the server. The server then updates the presence score. In another embodiment, a video puzzle is used instead of a QR code. For example, an AR CAPTCHA puzzle is transmitted to the user device or the secondary device. The user solves the puzzle and transmits the solution to the server, which determines the resulting presence score.

In an embodiment, a method is provided for establishing a presence score. The method comprises capturing an image of a QR code displayed on a secondary device, capturing a sound clip of a sound signal reproduced on the secondary device, and transmitting the image and the sound clip to a server. The method also comprises receiving a presence score determined from at least one of a comparison of the QR code to the image and a comparison of the sound signal to the sound clip.

In an embodiment, apparatus is provided for establishing a presence score. The apparatus comprises a processor configured to capture an image of a QR code displayed on a secondary device, and to capture a sound clip of a sound signal reproduced on the secondary device. The apparatus also comprises a transceiver configured to transmit the image and the sound clip to a server, and receive a presence score determined from at least one of a comparison of the QR code to the image and a comparison of the sound signal to the sound clip.

In an embodiment, a non-transitory computer readable medium is provided on which are stored program instructions that, when executed by one or more processors, cause the one or more processors to establish a presence score by performing operations of: capturing an image of a QR code displayed on a secondary device; capturing a sound clip of a sound signal reproduced on the secondary device; transmitting the image and the sound clip to a server; and receiving a presence score determined from at least one of a comparison of the QR code to the image and a comparison of the sound signal to the sound clip.

Additional features and benefits of the exemplary embodiments of the present invention will become apparent from the detailed description, figures and claims set forth below.

BRIEF DESCRIPTION OF THE DRAWINGS

The exemplary embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
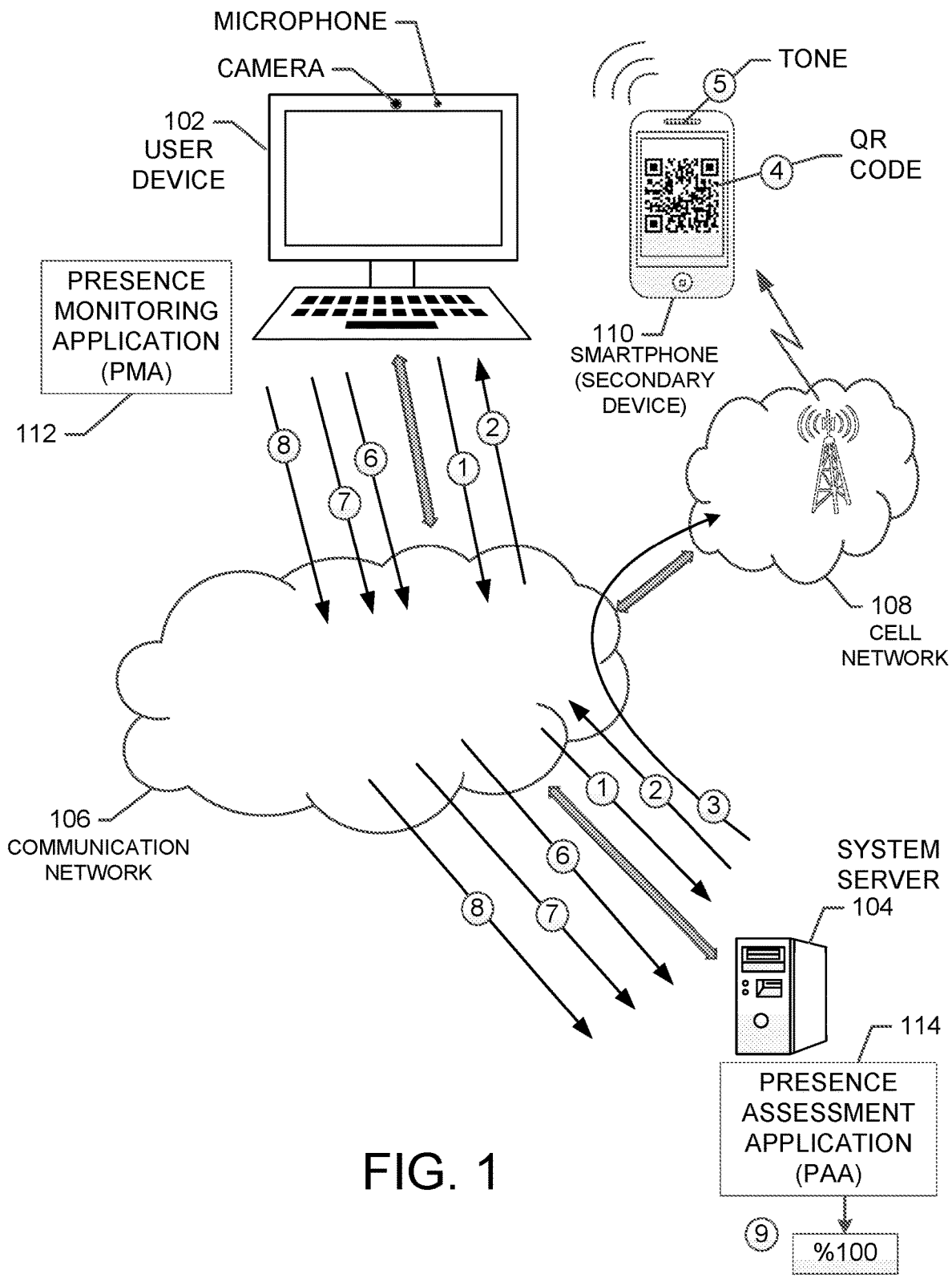
FIG. 1 shows a diagram of a communication network that illustrates embodiments of real-time presence assessment.

Embodiments of the present invention disclose systems, methods, and apparatus for providing real-time presence assessment and monitoring.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and business related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

In accordance with the embodiments of the present invention, the components, process steps, and/or data structures described herein may be implemented using various types of operating systems, computing platforms, computer programs, and/or general-purpose machines. In addition, those of ordinary skills in the art will recognize that devices of a less general-purpose nature, such as hardware devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine, those process steps can be stored as a series of instructions readable by the machine or computer for execution. The instructions may be stored on a tangible medium such as, but not limited to, magnetoresistive random access memory ("MRAM"), phase-change memory, or ferroelectric RAM ("FeRAM"), flash memory, ROM (Read Only Memory), PROM (Programmable Read Only Memory), EEPROM (Electrically Erasable Programmable Read Only Memory), Jump Drive, magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instructions and refers to one or a cluster of computers, personal computers, workstations, mainframes, or combinations of computing devices thereof.

FIG. 1 shows a diagram of a communication network 100 that illustrates embodiments of real-time presence assessment. The communication network 100 comprises a user device 102, system server 104, communication network 106, cellular network 108, and smartphone 110. In an embodiment, the system server 104 executes a real-time presence assessment application (PPA) 114, and the user device 102 executes a real-time presence monitoring application (PMA 112), which operate together to determine real-time presence assessments. It should be noted that the user device 102 comprises any device or user equipment, such as a desktop computer, laptop, notebook, tablet, smartphone or any other type of device suitable to perform the operations of the embodiments disclosed herein.

During operation, the user device 102 transmits a request (1) to the server 104 to initiate or join a conference or perform some other remote function. The server 104 responds to the request (1) by transmitting an instruction (2) to the user device 102 to initiate a presence assessment. The server 104 then transmit a QR code and sound signal (collectively shown at (3)), to the smartphone 110. The transmission is performed using the network 106 and the cellular network 108. In an embodiment, the smartphone 100 is associated with the user of the user device 102.

The smartphone 110 displays an image of the QR code (4) on a display screen and reproduces the sound signal as a tone (5) emanating from a speaker within the smartphone 110. The user of the user device 102 holds the smartphone 110 up to a camera of the user device 102 so that the camera can capture the image of the QR code (4) displayed on the smartphone display screen. The user also holds the smartphone close to a microphone of the user device 102 so that the microphone can capture a sound clip of the tone (5) being reproduced by the speaker of the smartphone.

The user device 102 transmits the captured image of the QR code (6) and the captured sound clip (7) to the server 104. The PMA 112 also transmits a resource identifier (8) to the server 104. The resource identifier identifies resources, such as the camera and microphone resources, currently in use at the user device 102.

At the server 104, the PAA 114 receives the image (6), sound clip (7), and resource identifier (8) and determines a presence score (9) that indicates the probability that an actual person at the user device 102 is interacting with the serve 104 in real-time. For example, a high presence score indicates that an actual person is interacting with the server, and a low presence score indicates that a robot, simulation, or pre-stored information is being used to interact with the server. The PAA 114 transmits the determined presence score to back to the user device 102. The requested conference or other function can be conducted when the presence score exceeds a selected threshold. For example, if the presence score is greater than 90%, the requested function will be performed. If the presence score is below the threshold, the request from the user to perform the network function is denied.

The PMA 112 also monitors the operation of the user device 102 to determine if there is a change to the resources used for the conference or remote function. For example, a change in resources, such as a change in the camera or microphone, may indicate the user is no longer interacting in real-time. When a change in resources occurs, the PMA 112 transmits an updated resource identifier (8) to the server that identifies the new resources. The PMA 114 updates the presence score (9) based on the updated resources and determines whether or not the conference or other network function can continue. The presence score can also be stored or logged for later use.

In various exemplary embodiments, the user device 102 and the server 104 provide real-time presence assessment by performing one or more of the following operations.

1. A user of user device 102 transmits request (1) to initiate or join a conference or perform some other function using remote participation.
2. The server 104 initiates (2) real time presence scoring to determine the probability that an actual user is interacting with the server in real time.
3. The server transmits a QR code and sound signal (tone) to a secondary device associated with the user of the user device 102. The secondary device displays the QR code (4) and reproduces the tone (5).
4. The user of the user device 102 holds secondary device to a camera and microphone of the user device so that the camera can capture the image of the QR code (4) and the microphone can capture a sound clip of the tone (5).
6. The user device transmits the captured image of the QR code and the sound clip to the server, as indicate at (6) and (7).
7. The user device transmits a resource identifier (8) that identifies resources utilized at the user device.
8. The server determines a presence score (9) based on the capture image (6), sound clip (7), and resource identifier (8). If the presence score is greater than a threshold value, the user request (1) will be granted. If the presence score is not greater than a threshold value, the user request (1) will be denied.
9. Assuming the request is granted, the user device monitors resource usage and transmits an updated resource identifier (8) if the resources utilized at the user device change.
10. The server updates the presence score to reflect the change in the resources at the user device. If the updated presence score is greater than a threshold value, the user participation in the requested function will be allowed to continue. If the presence score is not greater than a threshold value, the user participation in the requested function will be terminated.

Thus, embodiments of real-time presence assessment are provided by the server 104 executing the PAA 114 and the user device 102 executing the PMA 112. More detailed descriptions of the various implementations and operations of the server 104 and the user device 102 to provide real-time presence assessment are provided below.

Figure 2:
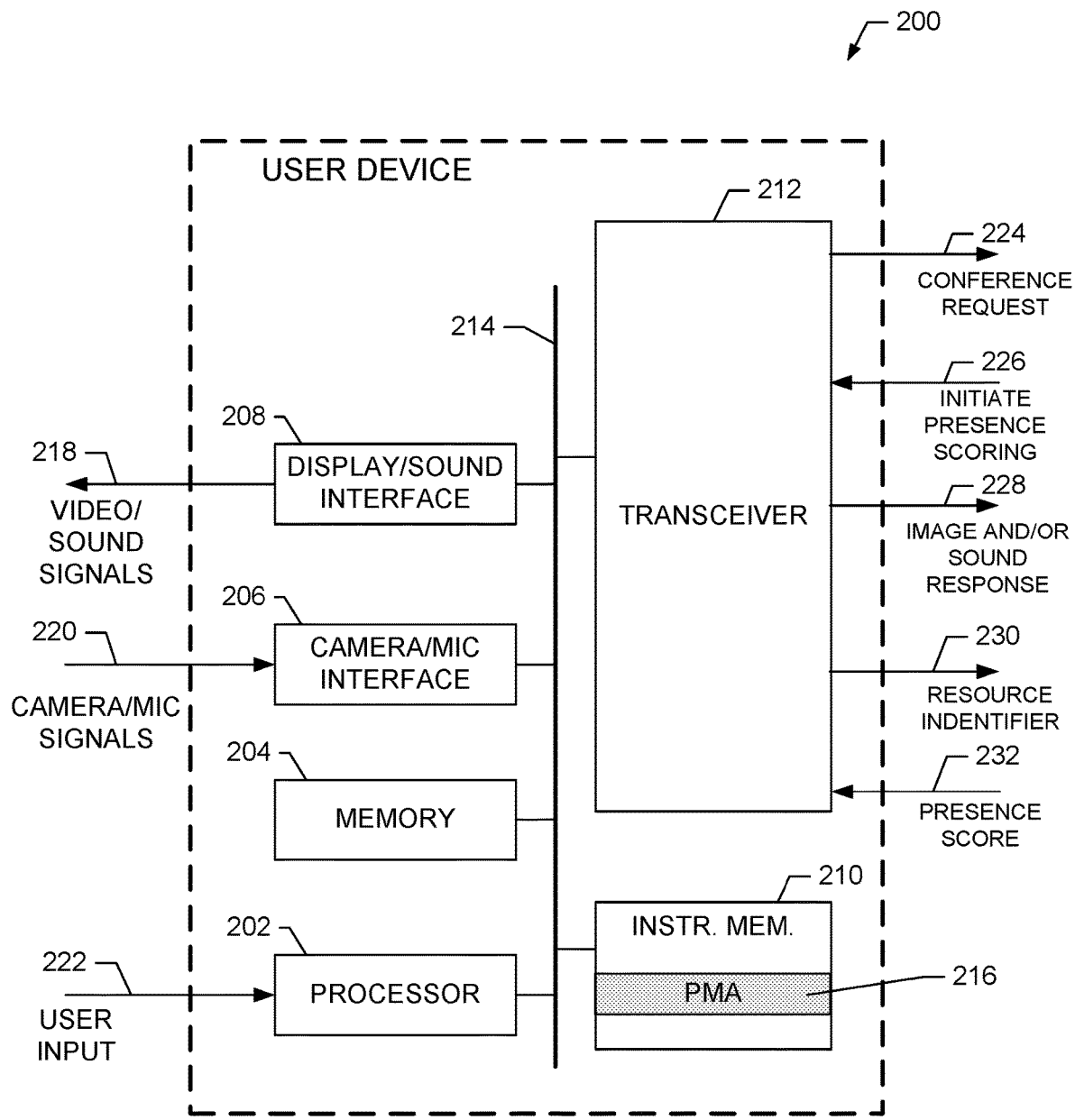
FIG. 2 shows an exemplary user device configured to provide embodiments of real-time presence assessment.

FIG. 2 shows an exemplary user device 200 configured to provide embodiments of real-time presence assessment. For example, the user device 200 is suitable for use as the user device 102 shown in FIG. 1. The user device 200 comprises processor 202, memory 204, camera/microphone interface 206, display/sound interface 208, instruction memory 210, and transceiver 212 all connected to communicate over data bus 214. In an embodiment, the instruction memory 210 comprises presence monitoring application 216.

During operation, the processor 202 executes the presence monitoring application 216 to perform the functions and operations of the user device described herein. For example, the processor 202 controls the camera/mic interface 206 to receive camera/microphone signals 220 from a camera and microphone mounted at the user device. The display/sound interface 208 is configured to output video/sound signals 218 to a video display and sound reproduction speaker that are part of the user device.

The processor 202 also receives user input 222 and responds to this input to perform various functions of the user device. The transceiver 212 is controlled by the processor 202 to transmit and receive information over communication networks. For example, transceiver 212 is configured to transmit and receive information over the networks 106 and 108 shown in FIG. 1.

In an embodiment, the processor 202 controls the transceiver 212 to transmit a conference request signal 224 to a conference server, such as the system server 104 shown in FIG. 1. As part of the request 224, the processor 202 includes information identifying the user device, the conference to be joined, and a secondary device accessible by the user of the user device 200. For example, the secondary device can be the smartphone 110 shown in FIG. 1.

In response to the request 224, the server 104 responds with a command to initiate presence scoring 226 that is received by the transceiver 212 and passed to the processor 202. The server 104 then generates and transmits a QR code to the secondary device. The server 104 also generates and transmits a sound signal to the secondary device. In an embodiment, the sound signal is dynamically generated or derived from the generated QR code. Upon receiving the QR code and the sound signal, the secondary device displays the QR code on a display screen of the secondary device and reproduces the received sound signal as an audible sound signal.

In response to the initiate command 226, the processor 202 instructs the user of the user device 200 to hold the secondary device up to the camera of the user device so that the image of the QR code on the display of the secondary device can be captured by the camera of the user device. For example, the processor 202 outputs instructions that are displayed to the user on the display screen of the user device. The processor 202 also instructs the user of the user device 200 to hold the secondary device up to the microphone of the user device so that the audible sound reproduced by the secondary device can be captured as a sound clip by the microphone of the user device. Thus, the camera image of the displayed QR code on the secondary device is received by the camera/microphone interface 206 and passed to the processor 202. The tone reproduced by a speaker of the secondary device is captured as a sound clip by the microphone of the user device. This sound clip is received by the camera/microphone interface 206 and passed to the processor 202.

The processor 220 controls the transceiver 212 to transmit the captured image and/or sound as a response 228 to the server. The processor 202 also controls the transceiver to transmit a resource identifier 230 that identifies the camera and microphone resources in use by the user device. The server uses the information transmitted by the user device to determine a presence score (0-100%) that indicates the probability that the user of the user device is a real person in actual real-time communication with the server. The presence score 232 is received by the transceiver 212 and passed to the processor 202. The processor 202 then saves and/or displays the presence score to the user of the user device. If the presence score is greater than a threshold value (e.g., 90%), the request 224 is granted. If the presence score is not greater than a threshold value, the request 224 is denied.

In an embodiment, the processor 202 executes the application 216 to monitor the resources used by the user device. For example, the processor 202 monitors the camera and microphone resources to determine if the resources that are being used have changed since the last resource identifier 230 was transmitted. A resource change, such as a change in the camera or microphone, may indicate that the user is not in actual real-time communication with the server. For example, a live video feed from the camera of the user device may be replaced with a video file that is being substituted for the live feed. When the processor 202 detects a change in the resources in use, the processor 202 generates an updated resource identifier 230 and transmits this updated indicator to the server. The server, then generates an updated presence score 232 that is transmitted back to the user device.

In various exemplary embodiments, the processor 202 executes the application 216 to perform the functions and operations of the user device 200. In an exemplary embodiment, the user device 200 performs at least the following operations to provide embodiments of real-time presence assessment.

1. The user device transmits a conference request 224 to a network server to join or host a network conference or to perform some other remote function. The request identifies the user device, a conference (or function) identifier, and a secondary device.

2. The user device receives an initiate presence scoring command 226 from the network server. The network server also generates a QR code and sound signal that is transmitted to the secondary device.

3. The user device instructs the user to position the secondary device so that a camera and microphone of the user device can capture an image of the QR code and an audible sound signal reproduced by the secondary device.

4. The user device transmits the capture image and/or sound response 228 to the server. The user device also transmits a resource identifier 230 that identifies the camera and microphone resources in use by the user device.

5. The user device receives a presence score from the server. If the presence score is greater than a threshold value (e.g., 90%), the request is granted. If the presence score is not greater than a threshold value, the request is denied.

6. The user device monitors the resources in use and if a change in the resources occurs, the user device transmits an updated resource identifier 230 to the server. The updated resource identifier 230 results in an updated presence score 232.

Figure 3:
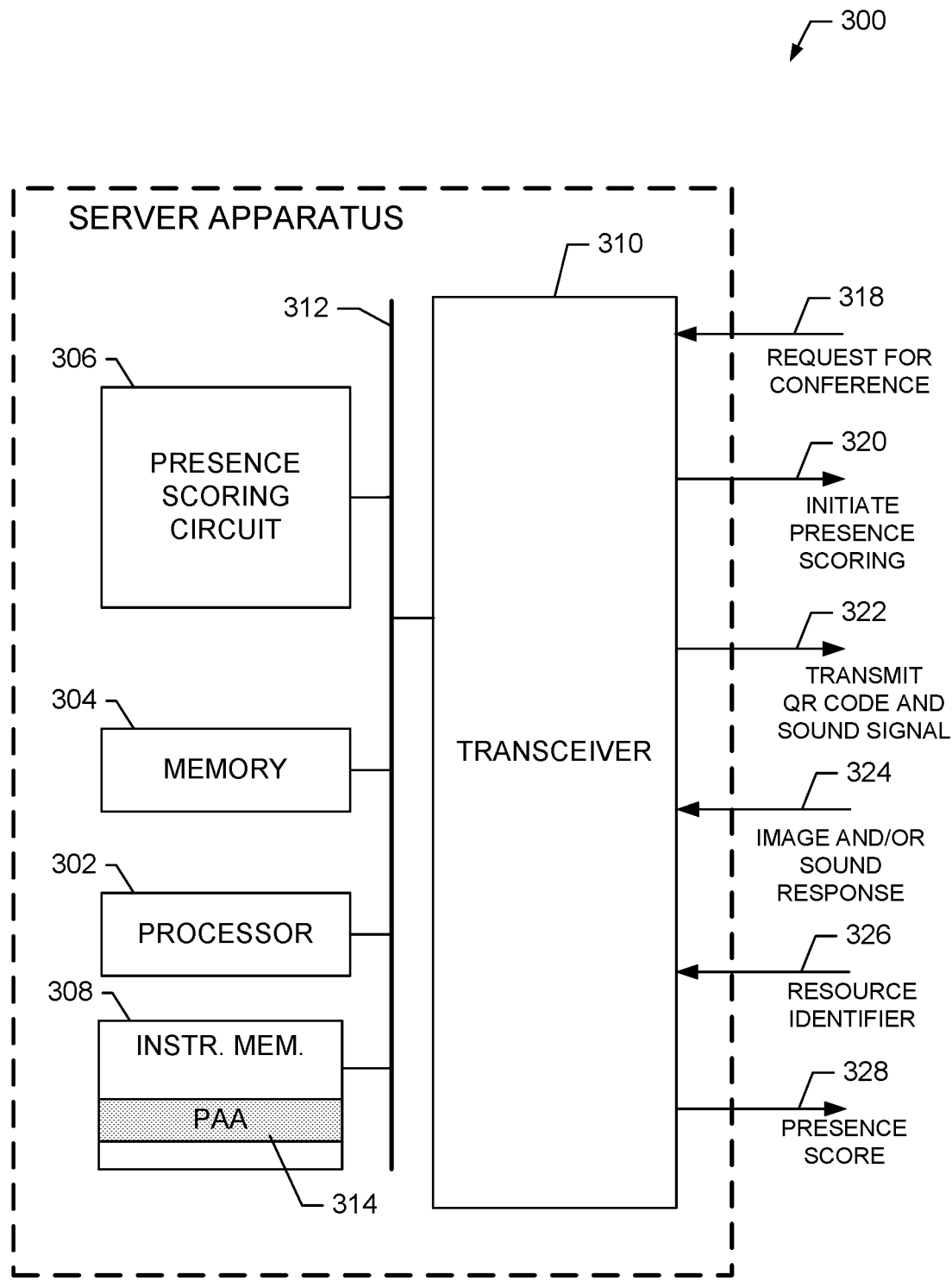
FIG. 3 shows an exemplary server configured to provide embodiments of real-time presence assessment.

FIG. 3 shows an exemplary server 300 configured to provide embodiments of real-time presence assessment. For example, the server 300 is suitable for use as the server 104 shown in FIG. 1. The server 300 comprises processor 302, memory 304, presence scoring circuit 306, instruction memory 308, and transceiver 310 all connected to communicate over data bus 312. In an embodiment, the instruction memory 308 comprises presence assessment application 314.

During operation, the processor 302 executes the application 314 to perform the functions and operations of the server described herein. The transceiver 310 is controlled by the processor 302 to transmit and receive information over communication networks. For example, transceiver 310 is configured to transmit and receive information over the networks 106 and 108 shown in FIG. 1.

In an embodiment, the processor 302 controls the transceiver 310 to receive a conference request signal 318 from a user device, such as the user device 102 shown in FIG. 1. The request 318, includes information identifying the user device, the conference to be joined, and a secondary device accessible by the user of the user device. For example, the secondary device can be the smartphone 110 shown in FIG. 1. In an embodiment, the request 318 identifies a function to be provided remotely to the user device.

In response to the request 318, the server 104 transmits a command to initiate presence scoring 320 that is received by the user device. The server 300 then generates and transmits a QR code and a sound signal 322 to the secondary device. In an embodiment, the sound signal is dynamically generated or derived from the generated QR code. Upon receiving the QR code and the sound signal, the secondary device displays the QR code on a display screen of the secondary device and reproduces the received sound signal as an audible tone.

In response to the initiate command 320, the user device positions the secondary device so that a camera at the user device can capture an image of the QR code. A microphone at the user device captures the sound signal reproduced by a speaker at the secondary device. The user device transmits the captured QR code and sound clip as an image and/or sound response 324 to the server 300. The user device also transmits a resource identifier 326 that is received by the transceiver 310 and passed to the processor 302.

The processor 302 uses the information received from the user device to determine a presence score (0-100%) that indicates the probability that the user of the user device is a real person in actual real-time communication with the server. In an embodiment, the processor 302 controls the presence scoring circuit 306 to generate the presence score. The processor 302 controls the transceiver 310 to transmit the presence score 328 to the user device. In an embodiment, if the presence score is greater than a threshold value (e.g., 90%), the request 318 is granted. If the presence score is not greater than a threshold value, the request 318 is denied. A detailed description of the presence scoring circuit 306 is provided below.

In an embodiment, the processor 302 executes the application 314 to update the presence score 328 when the resources used by the user device are changed. For example, the processor 302 monitors the resource identifier 326 to determine if the resources that are being used at the user device have changed since the last resource identifier 326 was received. A resource change at the user device, such as a change in the camera or microphone, may indicate that the user is not in actual real-time communication with the server. For example, a live video feed from the camera of the user device may be replaced with a video file that is being substituted for the live feed. When the processor 302 detects a change in the resources in use at the user device based on an updated resource identifier, the processor 302 controls the presence scoring circuit 306 to generate and updated presence score 328 that is transmitted to the user device. If the updated presence score falls below the threshold, then the functions being performed for the user may be terminated.

In various exemplary embodiments, the processor 302 executes the application 314 to perform the functions and operations of the server 300. In an exemplary embodiment, the server 300 performs at least the following operations to provide embodiments of real-time presence assessment.

1. The server receives a conference request 318 from user device to join or host a network conference. The request identifies the user device, a conference identifier, and a secondary device. The request may also request a function to be provided remotely to the user device.

2. The server generates and transmits an initiate presence scoring command 320.

3. The server generates a QR code and sound signal 322 that are transmitted to the secondary device identified by the user device in the request. In an embodiment, the sound signal is dynamically generated or derived from the QR code.

4. The server receives the image and/or sound response 324 from the user device. The server also receives a resource identifier 326 that identifies the camera and microphone resources in use by the user device.

5. The server generates a presence score based on the received image and/or sound response 324 and transmits this score to the user device. In an embodiment, if the presence score is greater than a threshold value (e.g., 90%), the request 318 is granted. If the presence score is not greater than a threshold value, the request 318 is denied.

6. The server monitors the resources in use at the user device and if a change in the resources occurs, as indicated by an updated resource identifier 326, the server generates an updated presence score and transmits the updated presence score 328 to the user device. If the updated presence score is below the threshold value, then the services being performed for the user may be terminated.

Figure 4:
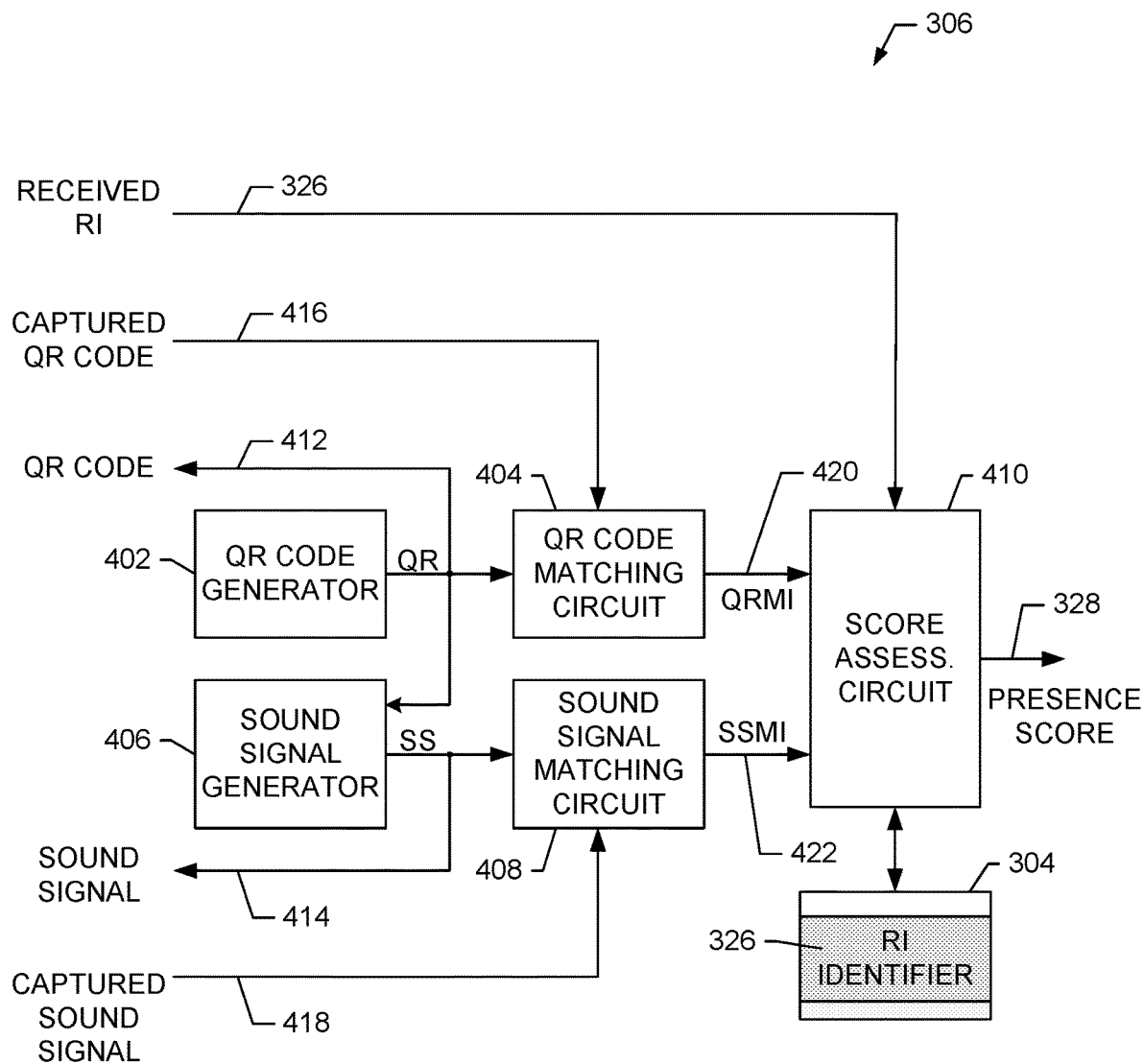
FIG. 4 shows an exemplary embodiment of the presence scoring circuit shown in FIG. 3.

FIG. 4 shows an exemplary embodiment of the presence scoring circuit 306 shown in FIG. 3. In an embodiment, the scoring circuit 306 comprises a QR code generator 402, QR matching circuit 404, sound signal generator 406, sound signal matching circuit 408, and score assessment circuit 410.

During operation, the QR code generator 402 generates a QR code 412. The QR code is a type of matrix barcode (or two-dimensional barcode). In practice, QR codes often contain data for a locator or identifier. In an embodiment, the QR code consists of black squares arranged in a square grid on a white background, which can be read by an imaging device such as a camera, and processed until the image can be appropriately interpreted. The required data is then extracted from patterns that are present in both horizontal and vertical components of the image. In an embodiment, the generated QR code 412 contains any suitable identification information.

The sound signal generator 406 generates a sound signal (SS) 414 comprising any suitable audio pattern, tone, and/or frequency. In an embodiment, the sound signal generator 406 receives the generated QR code 412 and uses this code to generate the sound signal 414. Thus, the sound signal is dynamically generated based on the QR code.

The QR code 412 and sound signal 414 form the transmit QR code and sound signal 322. In an embodiment, the image and sound response 324 from a user device comprises a captured QR code 416 that is input to the QR code matching circuit 404, and a captured sound signal 418 that is input to the sound signal matching circuit 408. The QR code matching circuit 404 matches the generated QR code 412 with the captured QR code 416 to determine a QR matching indicator (QRMI) 420 (in the range of 0-100) that indicates how well the two codes match. The sound signal matching circuit 408 matches the generated sound signal 414 with the captured sound signal 418 to determine s sound signal matching indicator (SSMI) 422 (in the range of 0-100) that indicates how well the two sound signals match.

The score assessment circuit 410 receives the QRMI 420 and the SSMI 422 and determine the presence score 328. For example, in one embodiment, the circuit 410 averages the QRMI 420 and the SSMI 422 to determine the score 328. The circuit 410 also receives the resource identifier 326 and can use this to adjust the presence score 328. In an embodiment, the resource identifier 326 is stored in the memory 304, and when a change in the resource identifier is detected, the circuit 410 adjusts the presence score. For example, if a less secure video resource or sound resource is identified by an updated resource identifier, then the presence score 328 may be reduced.

Figure 5:
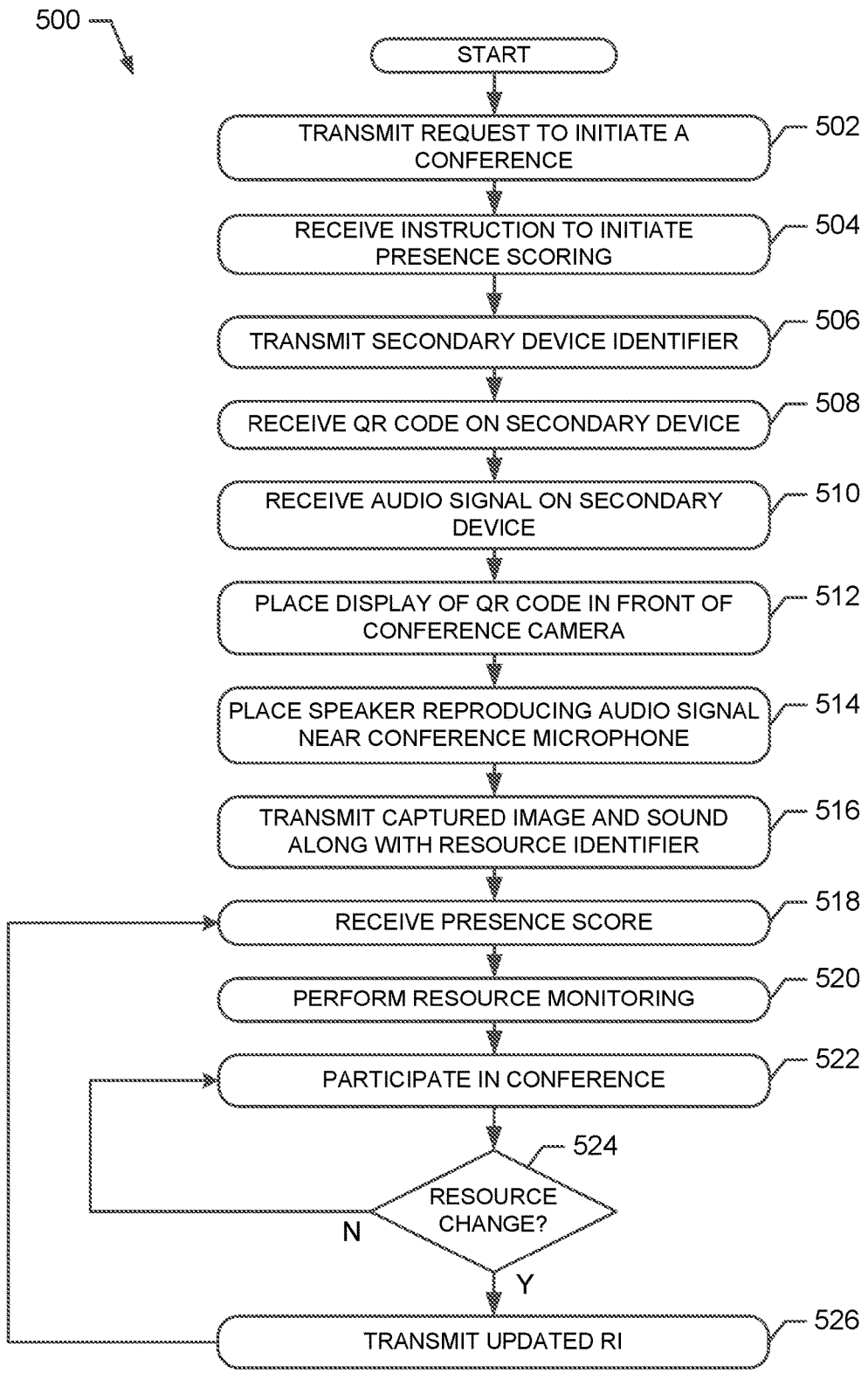
FIG. 5 shows an exemplary method for operating a user device to provide embodiments of real-time presence assessment.

FIG. 5 shows an exemplary method 500 for operating a user device to provide embodiments of real-time presence assessment. For example, in an embodiment, the method 500 is performed by the user device 102 shown in FIG. 1 or the user device 200 shown in FIG. 2. For example, the processor 202 executes the presence monitoring application (PMA) 216 to perform the operations described below.

At block 502, a conference is initiated by sending a request to a server. In an embodiment, the processor 202 of the user device 200 controls the transceiver 212 to transmit the request 224 to the server 104 to initiate a conference or other network function.

At block 504, an instruction to initiate presence scoring is received. For example, the user device receives the initiate presence scoring instruction 226 from the server 104. The instruction can have any suitable format.

At block 506, a secondary device identifier is transmitted from the user device. The secondary device identifier identifies a secondary device, such as a smartphone, that can be used to receive audio and video signals for use during presence scoring.

At block 508, a QR code is received at the secondary device. For example, the server generates the QR code and transmits this code over a network, such as the cellular communication network 108, to the smartphone 110. The received QR code is then displayed on a display screen of the smartphone.

At block 510, a sound signal representing a tone or other audible signal, is received at the secondary device. For example, the server generates the sound signal and transmits this sound signal over a network, such as the cellular communication network 108, to the smartphone 110. The received sound signal is then reproduced by a speaker of the smartphone to generate an audible sound. In an embodiment, the sound signal is dynamically generated based on the QR code so that as different QR codes are generated, different corresponding sound signals are also generated.

At block 512, the display of the QR code on the secondary device is placed in front of a camera on the user device so that the user device can capture an image of the QR code. For example, the user of the user device holds the smartphone up to the camera of the user device to capture an image of the QR code displayed on the display screen of the smartphone.

At block 514, the secondary device is placed in near of a microphone of the user device so that the audible sound reproduced by the speaker of the secondary device can be captured by the microphone of the user device. For example, the user of the user device holds the smartphone up to the microphone of the user device to capture a sound signal representing the audible sound generated by the smartphone.

At block 516, the captured image of the QR code and the captured sound signal are transmitted from the user device to the server. A resource identifier is also transmitted from the user device to the server. For example, the resource identifier identifies the camera and microphone resources in use at the user device. The server uses the transmitted information to generate a presence score.

At block 518, the generated presence score is received at the user device. If the presence score is greater than a threshold value (e.g., 90%), the request transmitted at block 502 is granted. If the presence score is not greater than the threshold value, the request is denied. Any desired threshold level can be utilized.

At block 520, assuming the request is granted, resource monitoring is performed at the user device. For example, the processor 202 monitors the camera and microphone resources at the user device to determine when any changes are made.

At block 522, the user device participates in the conference or other requested function.

At block 524, a determination is made as to whether a resource change has been detected at the user device. For example, the processor 202 detects when a change in the microphone or camera occurs at the user device. For example, a resource change occurs if a live video stream is replaced with a replay of a stored file. If a change is detected, the method proceeds to block 526. If no change is detected, the method proceeds to block 522.

At block 526, an updated resource identifier is generated and transmitted from the user device to the server. For example, the updated resource identifier identifies video and audio resource in use at the user device. The updated resource identifier is used to generate an updated presence score. The method proceeds to block 518 where the updated presence score is received at the user device.

Thus, the method 500 provides a method for operating a user device to provide embodiments of real-time presence assessment. It should be noted that the operations of the method 500 are exemplary and not limiting of the scope of the embodiments. Furthermore, the operations of the method 500 can be changed, deleted, combined, rearranged, added to, or otherwise modified within the scope of the embodiments.

Figure 6:
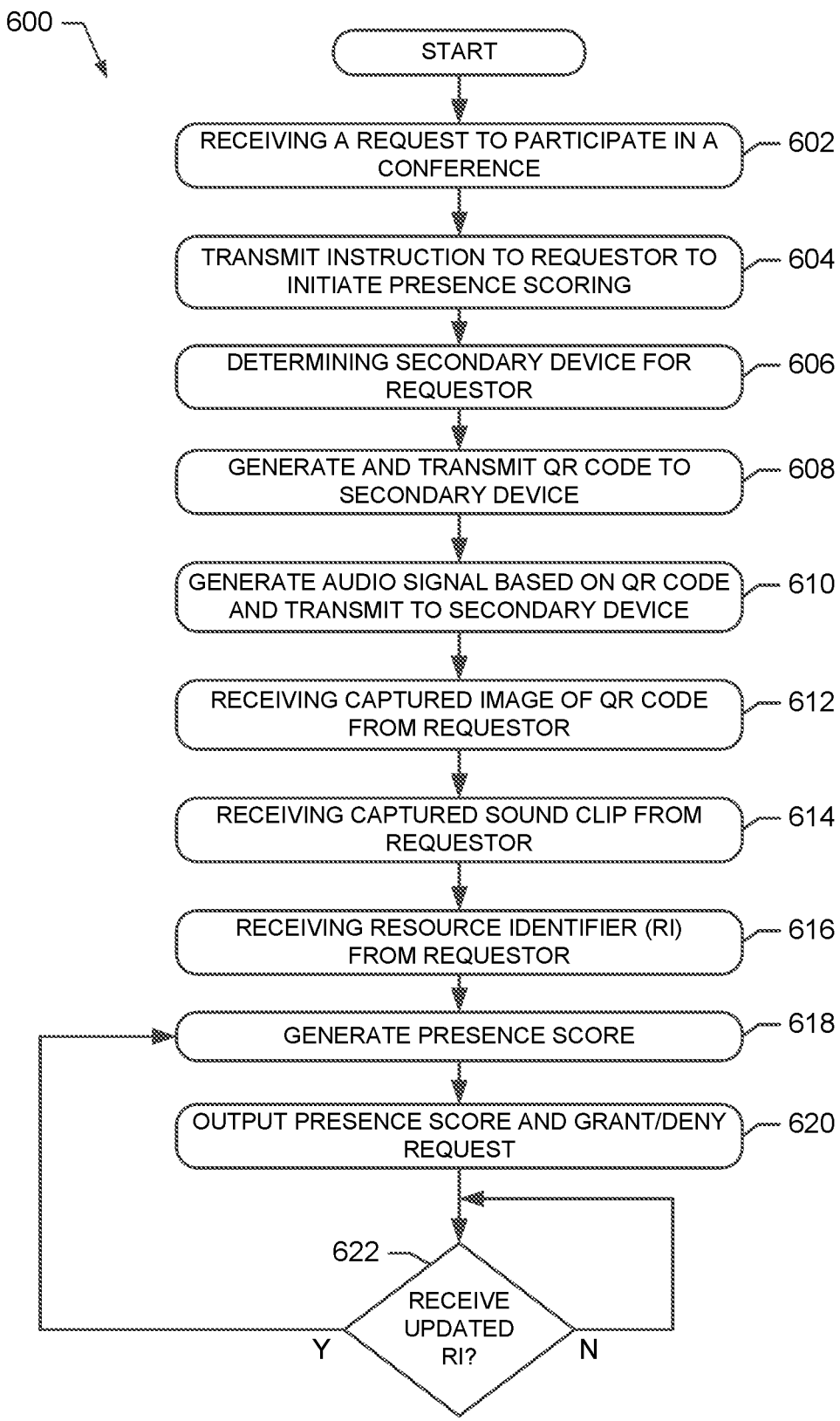
FIG. 6 shows an exemplary method for operating a server to provide embodiments of real-time presence assessment.

FIG. 6 shows an exemplary method 600 for operating a server to provide embodiments of real-time presence assessment. For example, in an embodiment, the method 600 is performed the server 104 shown in FIG. 1 or by the server apparatus 300 shown in FIG. 3. For example, the processor 302 executes the presence assessment application (PAA) 314 to perform the operations described below.

At block 602, a request is received to participate in a conference or to perform some other function remotely. For example, the server 300 receives the request 318 from a user device, such as user device 102.

At block 604, an instruction is transmitted to the requestor to initiate presence scoring. For example, the processor 302 controls the transceiver 310 to transmit the instruction 320 to the requestor to initiate presence scoring. In an embodiment, the instruction 320 can be in any suitable format.

At block 606, a secondary device for the requestor is determined. For example, in an embodiment, the request 318 includes a requestor identifier and a secondary device identifier. In another embodiment, the requestor identifier is used to access a database in the memory 304 that identifies a secondary device for that requestor.

At block 608, a QR code is generated and transmitted to the secondary device. In an embodiment, the processor 302 controls the presence scoring circuit 306 to generate a QR code 412 at block 402 as shown in FIG. 4. The generated QR code is transmitted to the secondary device as part of signal 322.

At block 610, a sound signal is generated and transmitted to the secondary device. In an embodiment, the processor 302 controls the presence scoring circuit 306 to generate a sound signal 414 at block 406 as shown in FIG. 4. The generated sound signal is transmitted to the secondary device as part of the transmitted signal 322. In an embodiment, the sound signal is dynamically generated based on the generated QR code so that the generated sound signal changes as new QR codes are generated.

At block 612, a captured image of the transmitted QR code is received from the requestor. For example, the user device 102 captures the image of the QR code from the display screen of the secondary device and transmits this captured image to the server. For example, the server 300 receives the captures image as part of the received signal 324.

At block 614, a captured sound clip of the transmitted sound signal is received from the requestor. For example, the user device 102 captures the sound clip of the sound signal as it is reproduced by a speaker of the secondary device. The user device 102 transmits this captured sound clip to the server. For example, the server 300 receives the captures sound clip as part of the received signal 324.

At block 616, a resource identifier (RI) is received from the requestor. For example, the resource identifier identifies the camera and microphone resources in use at the user device. The server receives the resource identifier 326 and uses this information to generate a presence score.

At block 618, a presence score is generated for the requesting device. In an embodiment, the presence scoring circuit 306 generates the presence score. For example, the received captured QR code and sound signal are matched to their transmitted versions by matching circuits 404 and 408. The score assessment circuit 410 determines how closely the signals match and generates the presence score 328.

At block 620, the presence score is output. For example, the processor 302 controls the transceiver 310 to transmit the presence score 328 to the requesting device. If the presence score is greater than a threshold value (e.g., 90%), the request received at block 602 is granted. If the presence score is not greater than the threshold value, the request is denied. Any desired threshold level can be utilized. The processor 302 makes this determination and informs the requestor of the decision with the transmitted presence score.

At block 622, assuming the presence score exceeds the threshold value, a determination is made as to whether an updated resource identifier has been received. For example, the processor 202 detects when an updated resource identifier 326 is received. The updated resource identifier indicates a change in resources, such as a change in the microphone or camera at the user device. If an updated resource identifier is detected, the method proceeds to block 618 where an updated presence score is determined. If an updated resource identifier is not detected, the method proceeds to block 622.

Thus, the method 600 provides a method for operating a server to provide embodiments of real-time presence assessment. It should be noted that the operations of the method 600 are exemplary and not limiting of the scope of the embodiments. Furthermore the operations of the method 600 can be changed, deleted, combined, rearranged, added to, or otherwise modified within the scope of the embodiments.

Figure 7:
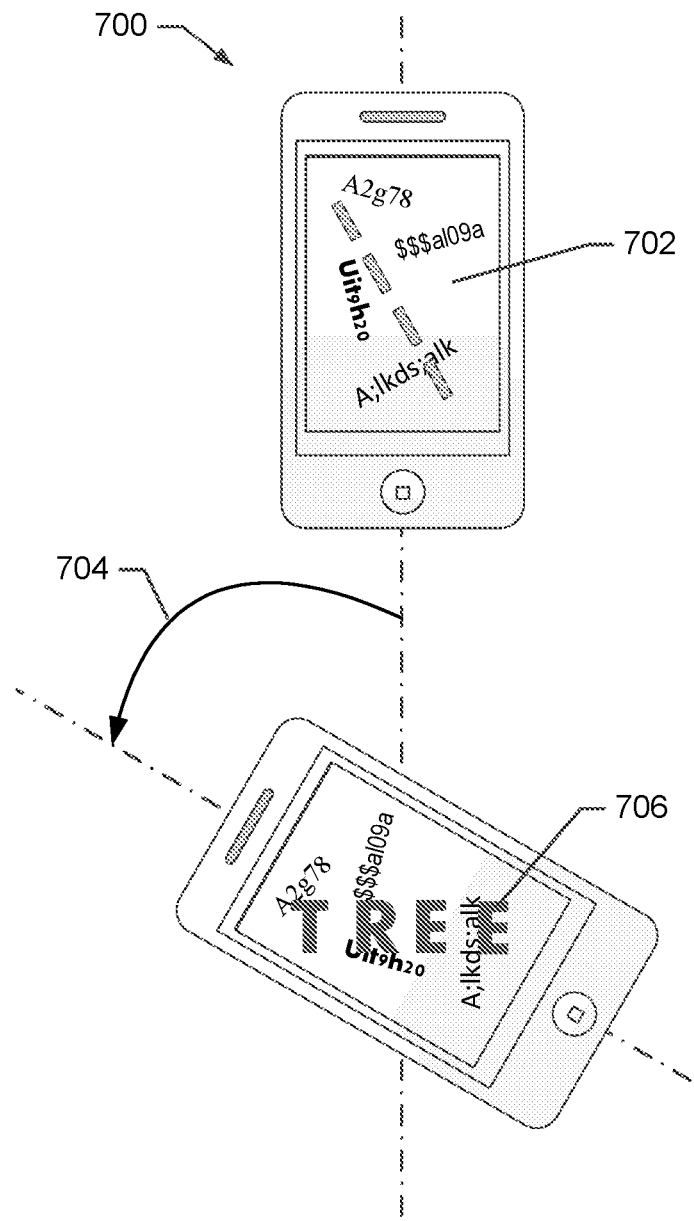
FIG. 7 shows an alternative embodiment for using a secondary device to perform real-time presence assessment.

FIG. 7 shows an alternative embodiment for using a secondary device to perform real-time presence assessment. Instead of sending a QR code to the secondary device, in this embodiment, a video challenge is sent to the secondary device. In an embodiment, the user of the secondary device solves a generated Augmented Reality (AR) CAPTCHA (completely automated public Turing to tell computers and humans apart) to prove their presence. For example, as illustrated in FIG. 7, an AR CAPTCHA 702 is sent to and displayed on a secondary device 700. For example, the CAPTCHA 702 is sent from the server to the secondary device at block 608. The CAPTCHA 702 comprises a variety of characters and symbols. As the device 700 is rotated by the user, as indicated at 704 for example, a code word appears. In this example, the code word "TREE" 706 appears. The user then enters this code word at a user device and it is transmitted back to the server, for instance, at block 516. The returned code word is used at the server to generate the presence score.

In an alternative embodiment, video challenges are used to detect presence. The user of the user device solves puzzles that are presented either on the user device or on the secondary device. For example, the video challenge may require that the user slide a virtual toggle with his/her hands, following a ball that rolls across the bottom of a display screen with his/her eyes, or tag shapes of a specific colors. In various embodiment, these video puzzles are solved either on the user device or on the secondary device. The results are transmitted back to the server, where the presence score is generated.

Figure 8:
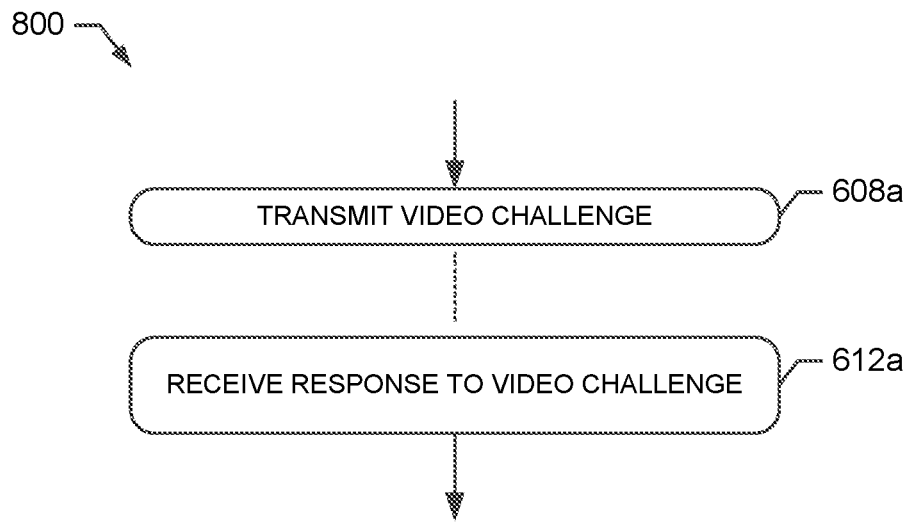
FIG. 8 shows an exemplary method for operating a server to provide embodiments of real-time presence assessment.

FIG. 8 shows an exemplary method 800 for operating a server to provide embodiments of real-time presence assessment. For example, in an embodiment, the method 800 is performed the server 104 shown in FIG. 1 or by the server apparatus 300 shown in FIG. 3. For example, the processor 302 executes the presence assessment application (PAA) 314 to perform the operations described below. The method 800 is similar to the method 600 but utilizes a video challenge instead of a QR code. For example, the presence scoring circuit 306 generates the video challenge at block 402 instead of the QR code, and the returned code is compared to the challenge code at block 404 to generate the matching indicator 420.

At block 608a, the server transmits the video challenge to either the user device or the secondary device. For example, block 608a replaces block 608 in the method 600. In an embodiment, the server transmits an AR CAPTCHA to the secondary device. The user rotates the secondary device to reveal a code that is transmitted back to the server.

At block 612a, the server receives a response to the video challenge from either the user device or the secondary device. For example, block 612a replaces block 612 in the method 600. In an embodiment, the server receives the code embedded in an AR CAPTCHA from the secondary device. The code is then used to generate the presence score.

Thus, the method 800 provides a method for operating a server to provide embodiments of real-time presence assessment. It should be noted that the operations of the method 800 are exemplary and not limiting of the scope of the embodiments. Furthermore the operations of the method 800 can be changed, deleted, combined, rearranged, added to, or otherwise modified within the scope of the embodiments.

Figure 9:
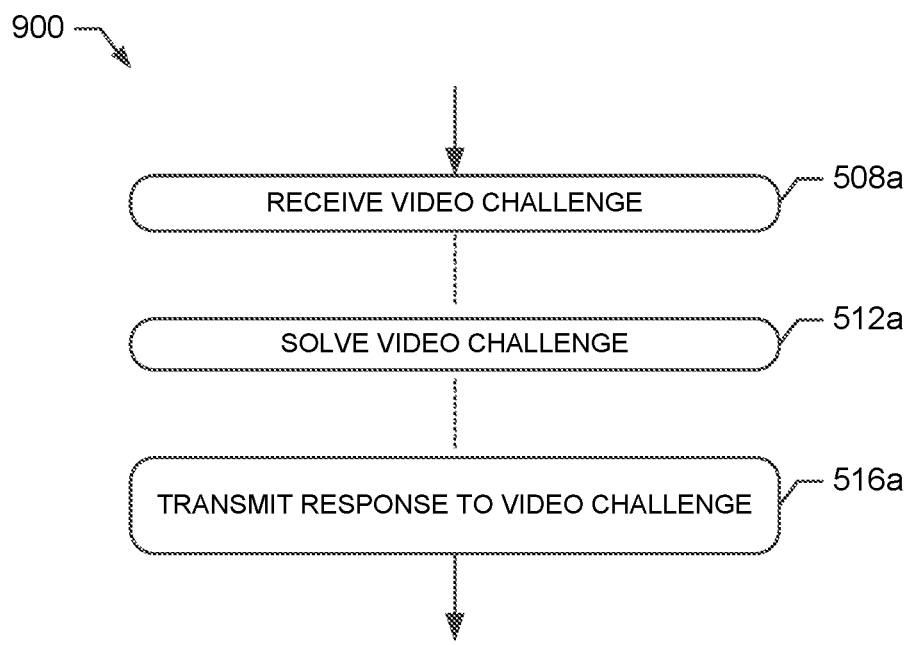
FIG. 9 shows an exemplary method for operating a user device to provide embodiments of real-time presence assessment.

FIG. 9 shows an exemplary method 900 for operating a user device to provide embodiments of real-time presence assessment. For example, in an embodiment, the method 900 is performed by the user device 102 shown in FIG. 1 or by the user device 200 shown in FIG. 2. For example, the processor 202 executes the presence monitoring application (PMA) 216 to perform the operations described below. The method 900 is similar to the method 500 but utilizes a video challenge instead of a QR code. For example, the presence scoring circuit 306 generates the video challenge at block 402 instead of the QR code, and the returned code is compared to the challenge code at block 404 to generate the matching indicator 420.

At block 508a, the secondary device associated with the user device receives a video challenge from the server. For example, block 508a replaces block 508 in the method 500. In an embodiment, the secondary device receives an AR CAPTCHA from the server.

At block 512a, the user rotates the secondary device to reveal a code in the display of the AR CAPTCHA. For example, block 512a replaces block 512 in the method 500.

At block 516a, the code is transmitted back to the server. For example, block 516a replaces block 516 in the method 500. The user enters the revealed code into the user device, which transmits the code to the server. The code is then used to generate the presence score.

Thus, the method 900 provides a method for operating a user device to provide embodiments of real-time presence assessment. It should be noted that the operations of the method 900 are exemplary and not limiting of the scope of the embodiments. Furthermore the operations of the method 900 can be changed, deleted, combined, rearranged, added to, or otherwise modified within the scope of the embodiments.

In an embodiment, the exemplary embodiments described herein are implemented using customized hard-wired logic, one or more ASICs or FPGAs, firmware and/or program logic which in combination with a computer system causes or programs the disclosed apparatus to be a special-purpose machine. According to one embodiment, the operations described herein are performed by a processor or computer executing one or more sequences of one or more instructions contained in memory. Such instructions may be read into memory from another storage medium. Execution of the sequences of instructions contained in memory causes a processor to perform the process steps described herein. In alternative embodiments, hard-wired circuitry may be used in place of or in combination with software instructions.

The term "storage media" as used herein refers to any non-transitory medium that stores data and/or instructions that cause a machine to operate in a specific fashion. Such storage media may comprise non-volatile media and/or volatile media. Non-volatile media includes, for example, optical or magnetic disks, such as memory 304 or instructions memory 308. Volatile media includes dynamic memory. Common forms of storage media include, for example, a floppy disk, a flexible disk, a hard disk, a solid state drive, a magnetic tape, or any other magnetic data storage medium, a CD-ROM, any other optical data storage medium, any physical medium with patterns of holes, a RAM, a PROM, and an EPROM, a FLASH-EPROM, an NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise one or more buses. Transmission media can also take the form of acoustic or light waves, such as those generated during radio-wave and infra-red data communications.

Various forms of media may be involved in carrying one or more sequences of one or more instructions to a disclosed processor for execution. For example, the instructions may initially be carried on a magnetic disk or a solid-state drive of a remote computer. The remote computer can load the instructions into its dynamic memory and send the instructions over a telephone line using a modem. A local modem can receive the data on the telephone line and use an infra-red transmitter to convert the data to an infra-red signal. An infra-red detector can receive the data carried in the infra-red signal and appropriate circuitry can place the data on a data bus, which carries the data to a memory, from which a processor retrieves and executes the instructions. The instructions may optionally be stored on a storage device either before or after execution by processor.

The exemplary embodiment of the present invention includes various processing steps described herein. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

While particular embodiments of the present invention have been shown and described, it will be obvious to those of ordinary skills in the art that based upon the teachings herein, changes and modifications may be made without departing from these exemplary embodiments of the present invention and its broader aspects. Therefore, the appended claims are intended to encompass within their scope all such changes and modifications as are within the true spirit and scope of this exemplary embodiments of the present invention.

What is claimed is:

1. A computer-implemented method, comprising:
   prior to a computer device joining a virtual conference, receiving a resource identifier that corresponds to at least one resource of the computer device;
   receiving an updated resource identifier from the computer device during the virtual conference; and
   terminating participation of the computer device in the virtual conference based on the received updated resource identifier.

2. The computer-implemented method as in claim 1, wherein terminating participation of the computer device in the virtual conference comprises:
   detecting a change of at least one resource that corresponds to the resource identifier; and
   terminating participation of the computer device in the virtual conference based on the detected change of the resource.

3. The computer-implemented method as in claim 2, wherein detecting a change of at least one resource that corresponds to the resource identifier comprises:
   detecting a difference between the resource identifier and the updated resource identifier.

4. The computer-implemented method as in claim 3, wherein the detected change comprises a change in a data format of output of the resource.

5. The computer-implemented method as in claim 3, wherein the detected change comprises a change in utilization of a microphone of the computer device.

6. The computer-implemented method as in claim 3, wherein the detected change comprises a change in utilization of a camera of the computer device.

7. The computer-implemented method as in claim 1, wherein receiving a resource identifier that corresponds to at least one resource of the computer device utilized for the virtual conference comprises:
   receiving a first resource identifier during a first portion of the virtual conference; and
   receiving a second resource identifier during a second portion of the virtual conference,
   the second portion of the virtual conference subsequent to the first portion of the virtual conference, the second resource identifier comprising an updated version of the first resource identifier.

8. The computer-implemented method as in claim 7, wherein terminating participation of the computer device in the virtual conference based on the received resource identifier comprises:
   providing the computer device remote access to the virtual conference based on the first resource identifier; and
   terminating participation of the computer device in the virtual conference based on an extent of a difference between the first resource identifier and the second resource identifier.

9. The computer-implemented method as in claim 7, wherein terminating participation of the computer device in the virtual conference based on the received resource identifier comprises:
   terminating participation of the computer device in the virtual conference based on the first resource identifier indicating a live video feed is being sent from the computer device to the virtual conference and the second resource identifier indicating that video file data has replaced the live video feed.

10. A system comprising one or more processors, and a non-transitory computer-readable medium including one or more sequences of instructions that, when executed by the one or more processors, cause the system to perform operations comprising:
    prior to a computer device joining a virtual conference, receiving a resource identifier that corresponds to at least one resource of the computer device;
    receiving an updated resource identifier from the computer device during the virtual conference; and
    terminating participation of the computer device in the virtual conference based on the received updated resource identifier.

11. The system as in claim 10, wherein terminating participation of the computer device in the virtual conference comprises:
    detecting a change of at least one resource that corresponds to the resource identifier; and
    terminating participation of the computer device in the virtual conference based on the detected change of the resource.

12. The system as in claim 11, wherein detecting a change of at least one resource that corresponds to the resource identifier comprises:
    detecting a difference between the resource identifier and the updated resource identifier.

13. The system as in claim 12, wherein the detected change comprises a change in a data format of output of the resource.

14. The system as in claim 12, wherein the detected change comprises: a change in utilization of a microphone of the computer device.

15. The system as in claim 12, wherein the detected change comprises: a change in utilization of a camera of the computer device.

16. The system as in claim 10, wherein terminating participation of the computer device in the virtual conference based on the received updated resource identifier comprises:
- terminating participation of the computer device in the virtual conference based on the resource identifier indicating a live video feed is being sent from the computer device to the virtual conference and the received updated resource identifier indicating that video file data has replaced the live video feed.

17. A computer program product comprising a non-transitory computer-readable medium having a computer-readable program code embodied therein to be executed by one or more processors, the program code including instructions to:
- prior to a computer device joining a virtual conference, receiving a resource identifier that corresponds to at least one resource of the computer device;
- receiving an updated resource identifier from the computer device during the virtual conference; and
- terminating participation of the computer device in the virtual conference based on the received updated resource identifier.

\* \* \* \* \*